United States Patent [19]
Kubota et al.

[11] 4,355,512
[45] Oct. 26, 1982

[54] RESERVOIR FOR USE WITH TANDEM MASTER CYLINDER

[75] Inventors: Hitoshi Kubota, Fujisawa; Toshiyuki Takahashi, Hayamamachi; Yoshihiro Hayashida, Kawasaki, all of Japan

[73] Assignee: Nissan Motor Company, Ltd., Yokohama, Japan

[21] Appl. No.: 197,129

[22] Filed: Oct. 15, 1980

[30] Foreign Application Priority Data

Oct. 17, 1979 [JP] Japan .................. 54-143594[U]

[51] Int. Cl.³ ............................... B60T 17/22
[52] U.S. Cl. ................................ 60/534; 60/585
[58] Field of Search ............... 60/585, 592, 534, 535, 60/545

[56] References Cited

U.S. PATENT DOCUMENTS

| 3,744,513 | 7/1973 | Leitenberger | 137/255 |
| 3,989,056 | 11/1976 | Reinartz | 60/585 |
| 4,127,210 | 11/1978 | Sabat | 60/592 |
| 4,147,270 | 4/1979 | Brandon, Jr. | 60/592 |
| 4,166,431 | 9/1979 | Pickering | 60/585 |
| 4,168,613 | 9/1979 | Nakagawa | 60/592 |
| 4,170,877 | 10/1979 | Pickering | 60/592 |
| 4,217,922 | 8/1980 | Come | 60/592 |

FOREIGN PATENT DOCUMENTS 54-130766 10/1979 Japan ..................... 60/585

Primary Examiner—Abraham Hershkovitz
Attorney, Agent, or Firm—Schwartz, Jeffery, Schwaab, Mack, Blumenthal & Koch

[57] ABSTRACT

A reservoir for use with a tandem master cylinder consisting of an elongated housing generally extending along the longitudinal axis of the master cylinder and including top and bottom walls and side walls, a partitioning wall provided between the top and bottom walls and extending laterally from either of the side walls toward the other side wall thereby partitioning the interior of the housing into two chambers. The partitioning wall further extends longitudinally along the other side wall and is spaced therefrom to define therebetween a corridor-like passage communicating the two chambers. The corridor-like passage has an opening which is spaced from the bottom wall by a predetermined height. A liquid level warning device receiving chamber is formed in one of the two chambers and is defined by the laterally and longitudinally extending portions of the partitioning wall and by an additional wall having a slit which extends between the top and side walls.

4 Claims, 3 Drawing Figures

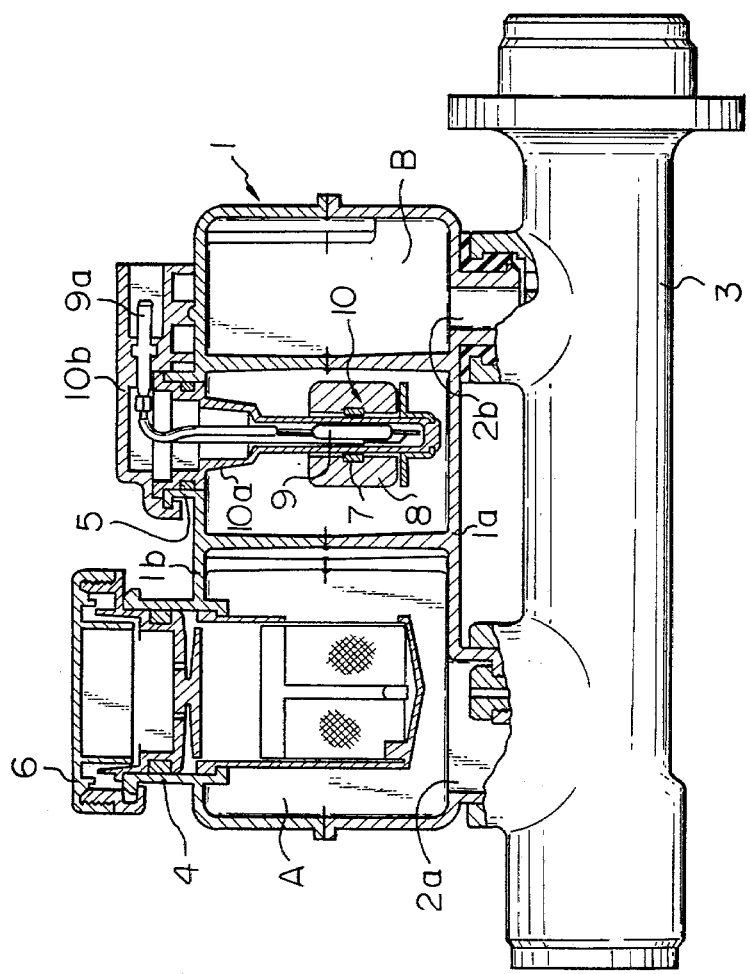

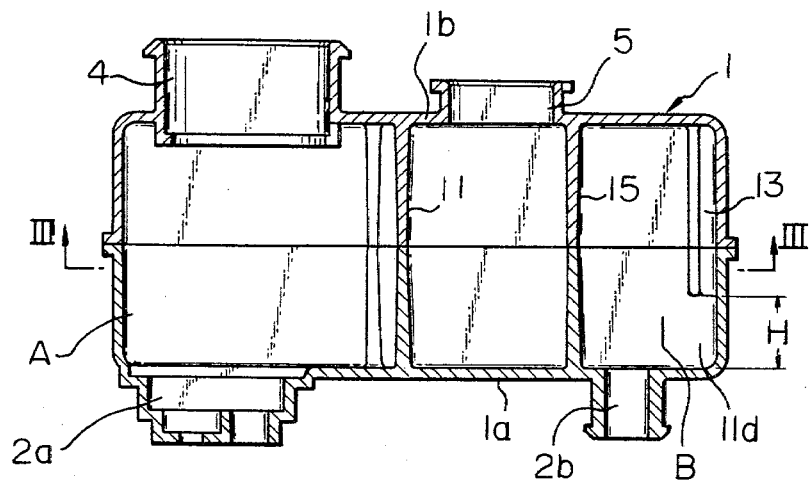
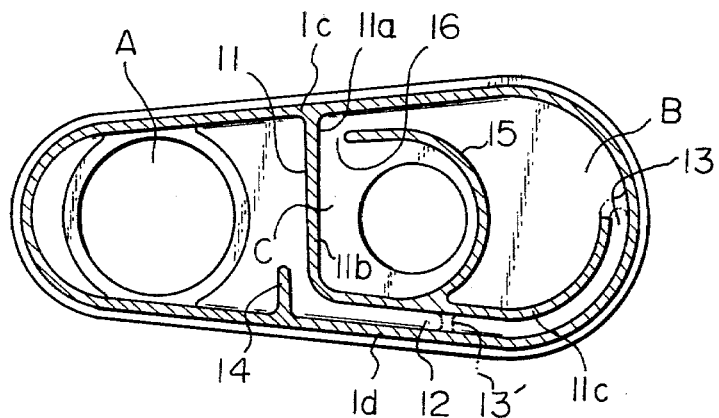

RESERVOIR FOR USE WITH TANDEM MASTER CYLINDER

BACKGROUND OF THE INVENTION

The present invention relates to a reservoir for use with a tandem master cylinder in a hydraulic braking system of a vehicle.

Usually, the reservoir has an elongated housing generally extending along the longitudinal axis of the reservoir whereby hydraulic liquid can be supplied from the reservoir to the master cylinder through two longitudinally spaced outlets formed in the reservoir and is supplied into two independent brake circuits, further, the interior of the reservoir is divided into two chambers by a partitioning wall, and an opening is provided in the partitioning wall so that the liquid can be supplied to the reservoir through a common filler opening, and the liquid level can be detected by a common liquid level warning device.

However, when the vehicle assumes an inclined position or is subjected to accelerations or decelerations, the liquid level changes whereby one brake circuit will fail due to the aspiration of air through one outlet of the reservoir, and the liquid level warning device will not actuate reliably. It has been proposed to connect the two chambers through a narrow passage, however, the narrow passage impedes the liquid filling operation.

SUMMARY OF THE INVENTION

The present invention aims to avoid these shortcomings and to provide a reservoir which assures the permissive liquid level on respective discharge openings and reliable actuation of the liquid level warning device even in case of the inclination, acceleration or deceleration, and minimizes the time for filling the reservoir.

The reservoir according to the invention is of the kind consisting of an elongated housing generally extending along the longitudinal axis of the master cylinder and including top and bottom walls and side walls, a partitioning wall is provided between the top and bottom walls and extends laterally from either of the side walls toward the other side wall thereby partitioning the interior of the housing into two chambers. According to the invention, the partitioning wall further extends longitudinally along the other side wall and is spaced therefrom to define therebetween a corridor-like passage communicating the two chambers. The corridor-like passage has an opening which is spaced from the bottom wall by a predetermined height. Further, a liquid level warning device receiving chamber is formed in one of the two chambers and is defined by the laterally and longitudinally extending portions of the partitioning wall and by an additional wall having a slit which extends between the top and bottom walls.

BRIEF DESCRIPTION OF THE DRAWINGS

The present invention will further be explained in conjunction with accompanying drawings exemplifying a preferred embodiment of the invention, in which:

FIG. 1 is a longitudinal sectional view of a reservoir according to the invention mounted on a tandem master cylinder;

FIG. 2 is a longitudinal sectional view of the housing of the reservoir of FIG. 1, and FIG. 3 is a sectional view taken along line III—III in FIG. 2.

DETAILED DESCRIPTION OF THE PREFERRED EMBODIMENTS

The reservoir shown in the drawings comprises a housing 1 having an elongated shape extending generally along the longitudinal axis of a master cylinder 3. The housing 1 includes a bottom wall 1a, a top wall 1b, and side walls 1c and 1d. In the bottom wall 1a there are provided two longitudinally spaced outlets 2a and 2b through which the reservoir is mounted on the master cylinder 3 and through which the liquid received in the reservoir is supplied to the master cylinder. In the top wall 1b, there are provided a filler opening 4 and an opening 5 for inserting therethrough and mounting a liquid level warning device 10. The liquid level warning device 10 comprises a float 8 incorporating a magnet 7, a reed switch 9 mounted in a tubular main body 10a, and a connector 10b receiving terminals 9a and mounting the main body 10a on the housing 1.

According to the invention a partitioning wall 11 is provided in the housing 1. One end 11a of the partitioning wall 11 is integrally secured to one side wall 1c. A portion 11b of the partitioning wall 11 extends laterally from the side wall 1c to divide the interior of the housing 1 into two chambers A and B. Further, the wall 11 extends generally in the longitudinal direction along the other side wall 1d to form a longitudinally extending portion 11c. The wall portion 11c is spaced from the side wall 1d to define therebetween a corridor-like passage 12. In the embodiment, the passage 12 extends rearwardly to the rear central portion of the housing 1. There is provided an opening 13 in the rear end portion of the corridor-like passage 12, and the opening 13 is spaced from the bottom wall 1b of the housing 1 by a predetermined height H. It will be noted that the partitioning wall 11 extends between the top and bottom walls 1a and 1b. The chambers A and B communicate with one another through the opening 13 and the corridor-like passage 12. Preferably, the height H is the minimum permissible liquid level at which the liquid level warning device 10 is preferably actuated. The opening 13 acts as a weir restricting liquid flow between chambers A and B.

Preferably, the corridor-like passage 12 extends generally longitudinally and then laterally as shown in FIG. 3, whereby changes during liquid level in the accelerations or decelerations can be minimized. It is not necessary to provide the opening 13 at the end of the corridor-like passage 12, the opening may be provided midway of the corridor-like passage 12 as shown in phantom lines 13' in FIG. 3.

Preferably, a baffle wall 14 is provided in the chamber A to face the corridor-like passage 12 so as to damp the liquid flow through the passage 12.

An arcuate wall 15 is branched from the longitudinally extending wall portion 11b of the partitioning wall 11 to define a liquid level warning device receiving chamber C in the chamber B. The arcuate wall 15 terminates at a location adjacent the laterally extending portion 11b of the partitioning wall 11 and defines therebetween a slit 16. The chamber C aligns with the liquid level warning device receiving opening 5 in the top wall 1b.

In the embodiment, the walls 11 and 15 extend between the top and bottom walls 1b and 1a of the housing 1, and the housing 1 has a two-pieces type construction.

According to the invention, the liquid level warning device 10 is received in the chamber C which communicates with the main portion of the chamber B through a relatively narrow slit 16 which is located at a longitudinally central portion of the housing, thus it is possible to minimize the effects of inclination, accelerations or deceleration on the liquid level in the chamber C, and a reliable operation of the liquid level warning device can be assured.

Further, the chambers A and B are connected with one another through the corridor-like passage 12 having the weir 13, thus, a permissible minimum amount of liquid can reliably be maintained in either of chambers A and B in the operating conditions of the vehicle. It is easy to fill the reservoir through the filler opening 4.

What is claimed is:

1. A reservoir for use with a tandem master cylinder comprising: an elongated housing generally extending along the longitudinal axis of the master cylinder and including top and bottom walls and first and second side walls, said housing defining therein a first chamber, a second chamber, and a liquid level warning device receiving chamber positioned between said first and second chambers, first and second outlets provided respectively in said first and second chambers in communication with the master cylinder, a partitioning wall extending between the top and bottom walls and having laterally and longitudinally extending portions, said laterally extending portions extending from the first side wall to an end adjacent to the second side wall and thereby partitioning the first chamber and the liquid level warning device receiving chamber, said longitudinally extending portion extending from said end along the second side wall and being spaced therefrom by a small distance to define a corridor-like passage communicating the second and the first chambers, and an additional wall extending between the top and bottom walls laterally from the longitudinally extending portion of said partitioning wall to the first side wall, said additional wall partitioning the second chamber and the liquid level warning device receiving chamber and including a slit extending between the top and bottom walls.

2. A reservoir as set forth in claim 1, wherein a baffle wall extends from said other side wall and adjacent to said corridor-like passage.

3. A reservoir as set forth in claim 1, wherein said additional wall is branched from said longitudinally extending portion of the partitioning wall and has a generally arcuate configuration to define a generally cylindrical said liquid level warning device receiving chamber.

4. A reservoir as set forth in claim 1, wherein said corridor-like passage has an opening which is spaced from said bottom wall by a predetermined height.

* * * * *

UNITED STATES PATENT AND TRADEMARK OFFICE
CERTIFICATE OF CORRECTION

PATENT NO. : 4,355,512

DATED : October 26, 1982

INVENTOR(S) : Hitoshi Kubota; Toshiyuki Takahashi and Yoshihiro Hayashida

It is certified that error appears in the above—identified patent and that said Letters Patent is hereby corrected as shown below:

On the title page, Assignee should read:

--Nissan Motor Company, Limited
Yokohama, Japan;

Nippon Air Brake Co., Ltd.
Kobe, Japan, and

Tokico Ltd.
Kawasaki, Japan--

Signed and Sealed this

Tenth Day of April 1984

[SEAL]

*Attest:*

GERALD J. MOSSINGHOFF

*Attesting Officer*  *Commissioner of Patents and Trademarks*